(12) United States Patent
Rauh et al.

(10) Patent No.: US 8,707,398 B2
(45) Date of Patent: Apr. 22, 2014

(54) METADATA CONTAINER-BASED USER INTERFACE FLEXIBILITY

(75) Inventors: Alexander Rauh, Weinheim (DE); Lars Erbe, Stutensee (DE); Thomas Gieselmann, Hockenheim (DE); Franz Mueller, Stutensee (DE); Sri A N Vidhya, Bangalore (IN); Nina Tabitha Paul, Bangalore (IN); Stefan Haffner, Hockenheim (DE); Vibhor Tomar, Bangalore (IN); Holger Schmidt, Sinsheim (DE)

(73) Assignee: SAP AG, Walldorf (DE)

( * ) Notice: Subject to any disclaimer, the term of this patent is extended or adjusted under 35 U.S.C. 154(b) by 269 days.

(21) Appl. No.: 12/976,968

(22) Filed: Dec. 22, 2010

(65) Prior Publication Data

US 2012/0167178 A1    Jun. 28, 2012

(51) Int. Cl.
*G06F 21/00* (2013.01)
*G06F 3/048* (2013.01)

(52) U.S. Cl.
USPC ................................. 726/4; 726/27; 715/743

(58) Field of Classification Search
None
See application file for complete search history.

(56) References Cited

U.S. PATENT DOCUMENTS

| | | | |
|---|---|---|---|
| 2002/0174010 A1* | 11/2002 | Rice, III | 705/14 |
| 2004/0025048 A1* | 2/2004 | Porcari et al. | 713/200 |
| 2008/0222192 A1* | 9/2008 | Hughes | 707/102 |
| 2008/0289006 A1* | 11/2008 | Hock et al. | 726/4 |
| 2010/0235789 A1* | 9/2010 | Liang | 715/811 |
| 2011/0265188 A1* | 10/2011 | Ramaswamy et al. | 726/28 |

* cited by examiner

*Primary Examiner* — Gilberto Barron, Jr.
*Assistant Examiner* — Malcolm Cribbs
(74) *Attorney, Agent, or Firm* — Mintz Levin Cohn Ferris Glovsky and Popeo, P.C.

(57) ABSTRACT

All metadata relevant to user interface functionality needed to provide a specific unit of business functionality can be stored in one of a plurality of autonomous metadata containers retained on at least one data storage device. After a subset of available business functionality to be provided to a user is determined, a set of the plurality of autonomous metadata containers required to provide the subset of available business functions can be identified. A user interface view can be generated to present a view associated with each of the set of the plurality of autonomous metadata containers, and the generated user interface view can be provided for display to the user. Related systems, articles of manufacture, and computer-implemented methods are described.

19 Claims, 9 Drawing Sheets

METADATA CONTAINER-BASED USER INTERFACE FLEXIBILITY

CROSS-REFERENCE TO RELATED APPLICATIONS

The current applicant is related to co-pending and co-owned application Ser. No. 12/976,868, filed on Dec. 22, 2010 and entitled "Dynamic User Interface Content Adaptation and Aggregation" and Ser. No. 12/976,877, filed on Dec. 22, 2010 and entitled "Dynamic Determination of Navigation Targets in a Flexible User Interface Environment," the disclosures of which are each incorporated by reference.

TECHNICAL FIELD

The subject matter described herein relates to metadata containers that can be used to provide user interface flexibility and aggregation, for example in a multi-tenant software architecture.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

SUMMARY

In one aspect, a computer-implemented method includes storing, in each of a plurality of autonomous metadata containers retained on at least one data storage device, all metadata relevant to user interface functionality needed to provide a specific unit of business functionality. After a subset of available business functionality to be provided to a user is determined, a set of the plurality of autonomous metadata containers required to provide the subset of available business functions is identified. A user interface view is generated to present a view associated with each of the set of the plurality of autonomous metadata containers, and the generated user interface view is provided for display to the user.

In optional variations, one or more of the following features can also be included. The set of autonomous metadata containers can include an application view container and a generic view container. The application view container can include at least one of data and metadata supporting a business function of a business application. The generic view container can include a user interface structure that incorporates at least one of data and metadata associated with at least one of the application view and another generic view. The determining of the subset of available business functionality to be provided to a user can include accessing a previously stored identity business object that includes authorization checks for view assignments for the user and related work center view assignments for the user. The subset of autonomous metadata containers can be selected such that the user interface view is consistent with permissions or authorizations held by or assigned to the user, a business scope assigned to the user, a current application context within which the user is working, and adaptations of one or more applications available to the user.

The generated user interface view can be provided to the user via a client tenant of a multi-tenant system comprising an application server providing access for each of a plurality of organizations to one of a plurality of client tenants. Each of the plurality of client tenants can include a customizable, organization-specific version of a core software platform that also integrates business functionality provided by at least one external software provider. The data repository can include core software platform content relating to the operation of the core software platform and that is common to all of the plurality of client tenants, system content having a system content format defined by the core software platform and containing system content data that are unique to specific client tenants of the plurality of client tenants, and tenant-specific content whose tenant-specific content formats and tenant-specific content data are defined by and available to only one of the plurality of client tenants. The subset of autonomous metadata containers can include a first autonomous metadata container that includes a first view relating to at least one of the core platform content and the system content, a second autonomous metadata container that includes a second view relating to the client tenant-specific content, and a third autonomous metadata container that includes a third view relating to external content relating to external service provider content from the at least one external service provider.

Articles are also described that comprise a tangibly embodied machine-readable medium operable to cause one or more machines (e.g., computers, programmable processors, etc.) to result in operations described herein. Similarly, computer systems are also described that may include a processor and a memory coupled to the processor. The memory may include one or more programs that cause the processor to perform one or more of the operations described herein.

Implementations of the current subject matter can provide many advantages, including, but not necessarily limited to the following. Flexible user interface functionality can be provided via a dynamic framework that can be executed at run time to deliver customized user interface features to a user without requiring hard coding of navigation targets or links. This capability can be very useful in a multi-tenant software architecture or in other environments in which design time hard coding of navigation links to navigation targets in a user interface can be difficult because of the end for flexibility in how aspects of the user interface are presented to users in different organizations as well as to different users in a single organization.

It should be noted that, while the descriptions of specific implementations of the current subject matter discuss delivery of enterprise resource planning software to multiple organizations via a multi-tenant system, the current subject matter is applicable to other types of software and data services access as well.

The details of one or more variations of the subject matter described herein are set forth in the accompanying drawings and the description below. Other features and advantages of the subject matter described herein will be apparent from the description and drawings, and from the claims. The scope of the subject matter claimed below therefore should not be limited except by the actual language of the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
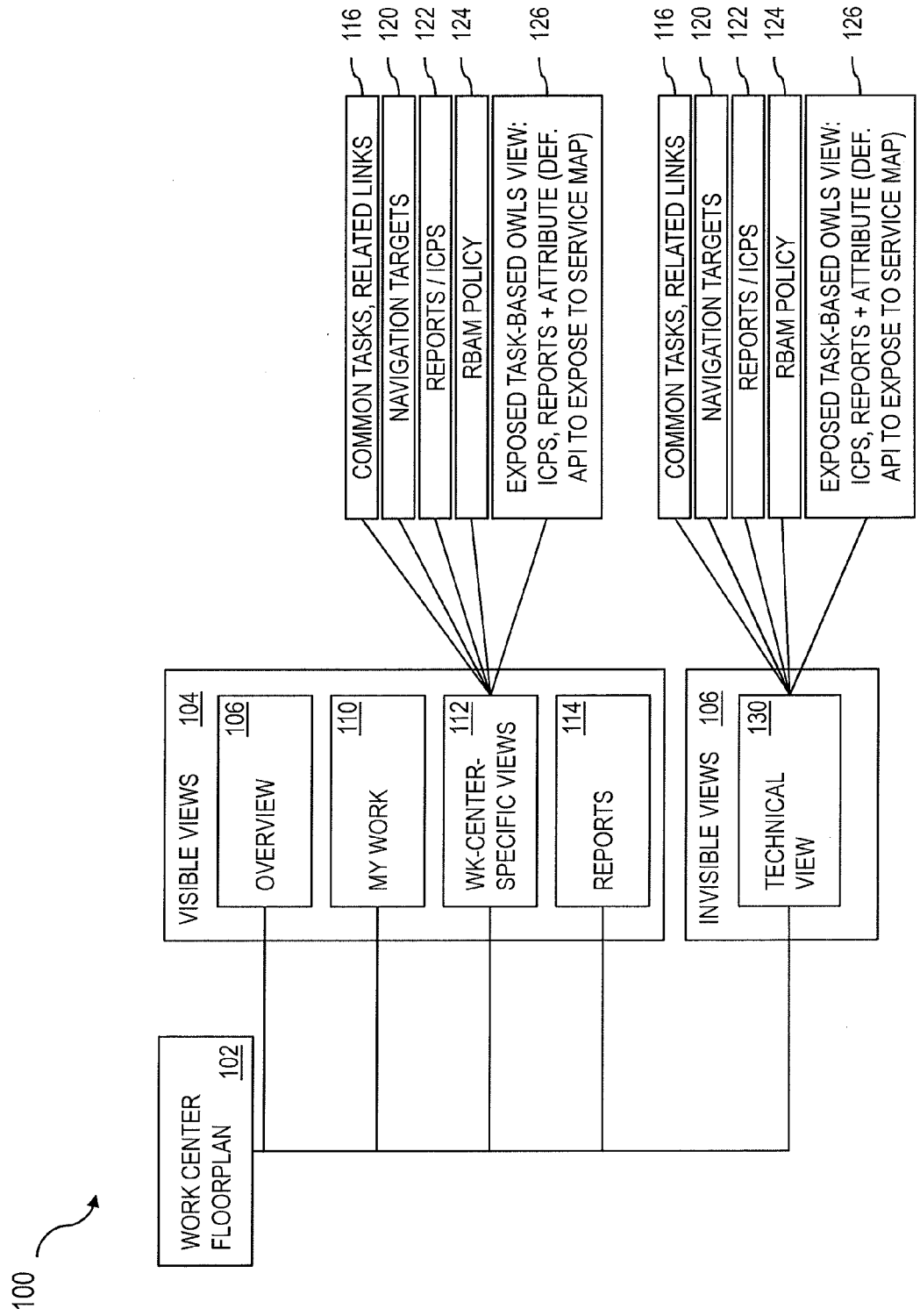
FIG. 1 is a diagram illustrating a structure of metadata containers underlying views.

As part of the installation process of a core software platform on computing hardware owned or operated by the organization, one or more customized features, configurations, business processes, or the like may be added to the default, preprogrammed features such that the core software platform is configured for maximum compatibility with the organization's business processes, data, and the like. The customized version of the core software platform presented to users at to an organization can therefore differ from the customized versions presented to users at other organizations. Additionally, within an organization, different subsets of users may need access to different sets of features. Customization of user interface environments to meet this variety of user needs can be cumbersome and time consuming.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Large organizations can generally justify the expense of tasking one or more programmers and user interface architects to design customized, hard coded user interface features to provide appropriate functionality to each of one or more classes of users.

Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network. Creation of customized user interface functionality for smaller organizations, for example by hard-coding of user interfaces and the required user interface navigation targets for each of one or more classes of users, can add significantly to the total cost of ownership. Such services can be provided by the SaaS provider, but doing so can be similarly inefficient, particularly for smaller client organizations that each require a custom installation, and can also require ongoing maintenance and updating services to reflect new functionality provided either by the SaaS provider or by third party applications from one or more external service providers that are integrated into the customized core software platform.

To address these and potentially other issues with currently available solutions, one or more implementations of the current subject matter provide methods, systems, articles or manufacture, and the like that can, among other possible advantages, provide flexible usage of semantic, well-defined user interface entities in the form of autonomous metadata containers. A metadata container can be provided as an atomic autonomous entity with all metadata relevant to a business scenario, function, or the like (hereinafter referred to generally as "business functionality") to cover flexible and dynamic use cases. Such metadata containers can avoid unnecessary duplication of metadata, particularly in a multi-tenant software architecture as is discussed in greater detail below. Metadata containers can be combined and their access permissions readily switched on and off and without the need for hard coding or other labor-intensive or expertise-intensive activities.

Two types of views can be included in some implementations of the current subject matter. An application container can be an autonomous entity or container designed for use with one or more specific business functionalities and can include all relevant metadata related to those one or more specific business functionalities. An application container can support an application view that provides user interface functionality related to the business functionality. A generic view can include overview views, work views, and report views that make use of the data and/or metadata associated with other application and generic views assigned to a user or task.

An application view can include main content, such as for example content provided using object work lists (OWL), common tasks and related links, navigation targets, authorization relevant components, business scenario-specific reports, information consumer pattern (ICP), overview content for the business functionality, business task management (BTM) tasks, business programming roles such as for example advanced business application programming (ABAP) authorization roles, scoping information, instance restrictions and data relevant to role-based access management access (RBAM), and the like. All relevant metadata for a given set of business functionality or functionalities can be provided within the container so that such a view can be reused in any number of work centers and can be combined in new work centers. These related metadata can include, but are not limited to, individual or aggregated common tasks, navigation targets and user interface functionality, reports, tasks, really simple syndication (RSS) feeds, and the like. Different combinations of user interface functionality can be can created based on organizational assignments, scoping, external service providers, key users, end users, etc.

A work center view presented to a user can be based on application views and generic views that are assigned to the user. A work center producing such a work center view can act as a framework unifying user interface features contained in one or more application views and generic views. The work center view specifies one or more independent sets of tasks being offered by a work center. For example, a work center view in a new business work center can provide a sales quotes view that displays functionality relating to generating cost and fee estimates for parts or services and producing price quotes to send to prospective customers of an organization. Assignment of specific functionality within a work center that is available to a specific user occurs at the work center view level at which the scope a user can work in is specified.

Application views can be assigned in various combinations to a user to provide a user interface experience consistent with permissions or authorizations held by or assigned to the user, a business scope of the user or the user's organization or sub-organization within the organization, a current application context within which the user is working, adaptations of one or more applications available to the user, etc.

The current subject matter facilitates creation of a new work center and its corresponding work center view based on existing application views, generic views, or the like. The box diagram 100 of FIG. 1 shows an example implementation of the current subject matter in relation to these and other features. A work center floor plan 102 can be created from a combination of one or more visible views 104 and invisible views 106. Visible (e.g. application) views 104 can include, but are not limited to, an overview view 106, a "my work" view 110, a work center-specific view 112, reports 114, and the like. Some representative examples of work center-specific views can include common tasks and related links 116, navigation targets 120, reports and ICPs 122, RBAM policies 124, and exposed task-based OWL views 126. An exposed task-based OWL view can include ICPs, reports, and attributes, such as for example to define an API to expose to a service map. Generic/invisible views can include technical views 130, which can include views similar to those noted above for the work center-specific views 112 Each visible/application view 104 and generic/invisible view 106 can be considered as an autonomous metadata container for a set of user interface applications and their user interface features with coverage of specific business aspects.

A user interface configuration can be delivered to a customer such that the customer (i.e. a key user, administrator, or end user at the organization) can build his or her own customized user interfaces on content of the core software platform as well as content provided by external application providers using a layered infrastructure. An administrator or key user with write privileges for a tenant can assign a selected view of a work center to a user and also give a read-only authorization on view level per user. For globalization use cases, development can make use of layering. For example, a repository storing user interface models can be accessed via a layering strategy that defines the sequence of layers to be accessed. Layers can include, but are not limited to a core platform layer (e.g. for providing standard content delivered by an ERP architecture), a globalization layer (e.g. for providing country-specific content), one or more independent software vendor (ISV) or partner layers (e.g. for providing content from external software components), and a customer layer (e.g. for personalization content). Content can be presented as a combination of layers in a specified order, for example with a customer layer at the top followed by one or more partner/ISV layers, a globalization layer, and a core platform layer. Content can be added, modified, or deleted in each successive layer to the content presented in the layers below it. Content from the highest presented layer should always be visible.

A generic/invisible view 106 can be used for analyzing view metadata and aggregating, displaying, etc. the content provided by an application view. Common tasks can be analyzed from the views and aggregated to the work center floorplan object 102. OWLs which are integrated in the views can be analyzed and aggregated to a quick link user interface, which can be part of a generic overview page. Reports can be analyzed and aggregated to a generic reports view. BTM Tasks can be analyzed and aggregated to a work view. Content which can be used for the personalization can be aggregated to a generic overview. Navigation targets can be analyzed and registered in the navigation registry. RBAM and other authorization rules can be analyzed and aggregated to a policy view.

As a result of each view being an autonomous entity containing and "owning" all relevant metadata to its associated business scenario or task, a work center object can be defined without hard coding any view combinations or restricting special or custom combinations of views. It is therefore possible to use and reuse any given view in a variety of flexible scenarios and/or combinations that can be accessed easily through a front end, object based user interface. Generic user interface shells can be provided for customization of one or more tenant-specific user interfaces for a given tenant that can make use of each and every combination of available view entities.

After logon of a user, for example via a client machine accessing a tenant of a multi-tenant architecture, a work center handler can be called to check which work centers and views are assigned via an identity business object that handles work center views, for example via a string based key, a relation to RBAM, or the like. A scoping definition can also be checked to return a correct work center structure for the user that includes a set of work centers for which the user is allowed access and a set of available work views of those allowed work centers from which the user can choose. A set of view policies can be defined based on the retrieved work center and the views available with that retrieved work center. The identity business object can store user view assignments, for example for use in authorization checks. A user interface component can be limited to obtaining its runtime semantic only in the context of a view.

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Such an approach can introduce several challenges. Making modifications to the core software platform, for example updating to a new version, implementing a change to the core functionality, or the like, can become a complicated and unpredictable process if each tenant's customized data objects and other tenant-specific configurations do not react in the same manner to the modifications. Additionally, during a lifecycle management event, such as for example an upgrade or update, many application specific tasks may have to be executed in a multi-tenant system. One or more of these actions have to run on every business tenant that exists in the multi-tenant system. However, to start a task on a specific tenant, a user logon with password can be necessary, thereby requiring that the lifecycle management procedure have ready access to authentication information, such as for example user names and passwords, for each tenant. Such a requirement can create numerous disadvantages, including but not limited to security concerns, logistical difficulties pertaining to maintaining a current listing of authentication information for numerous tenants, and the like.

To address these and potentially other issues, one or more implementations of the current subject matter provide methods, systems, articles or manufacture, and the like that can, among other possible advantages, provide improved and streamlined procedures for enacting changes, updates, and the like to multi-tenant software delivery architectures.

Figure 2:
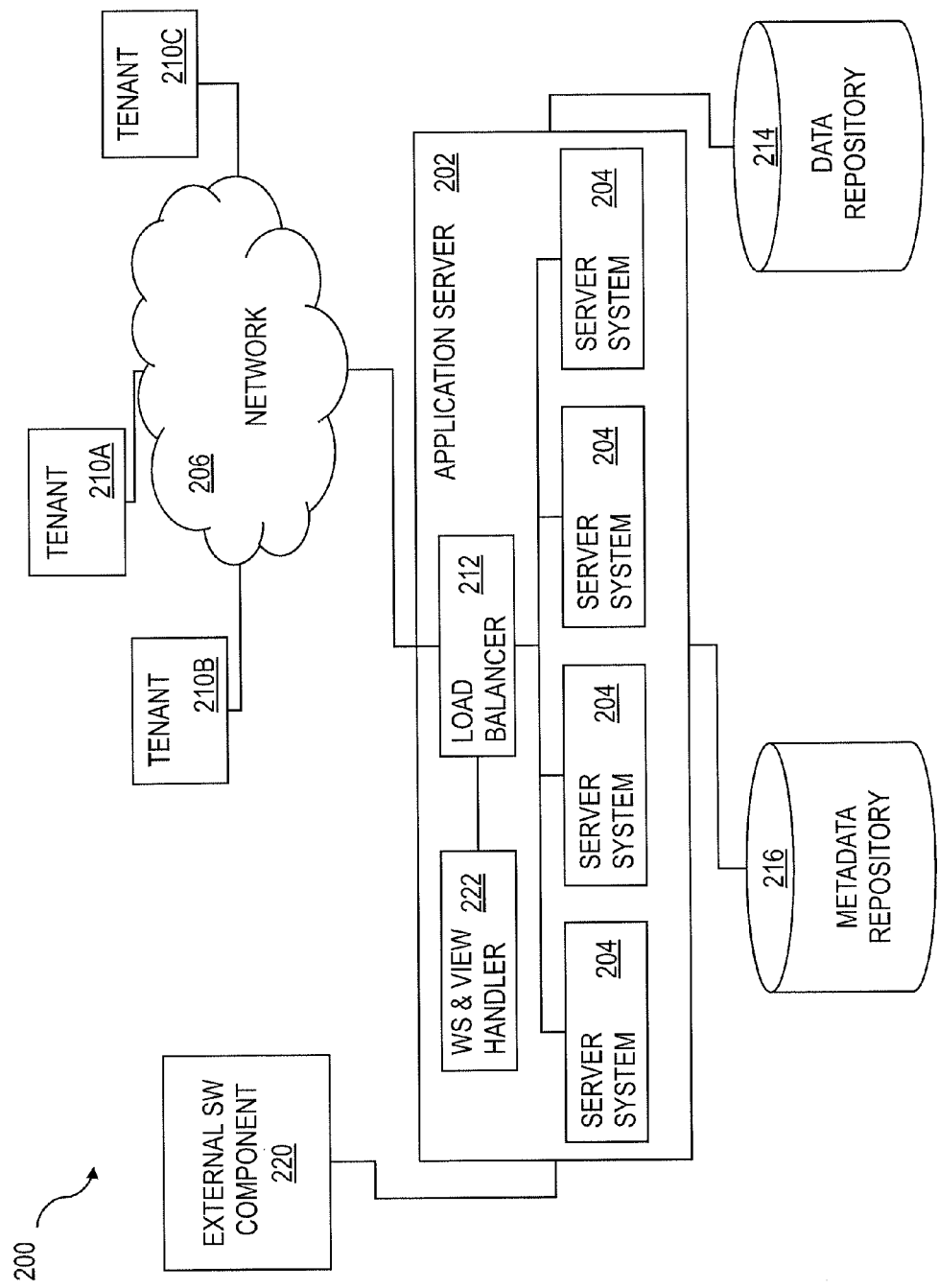
FIG. 2 is a diagram illustrating features of a multi-tenant architecture for providing customized software services to multiple organizations from a single architecture.

FIG. 2 shows a block diagram of a multi-tenant implementation of a software delivery architecture 200 that includes an application server 202, which can in some implementations include multiple server systems 204 that are accessible over a network 206 from client machines operated by users at each of multiple organizations 210A-210C (referred to herein as "tenant users" of a multi-tenant system) supported by a single software delivery architecture 200. For a system in which the application server 202 includes multiple server systems 204, the application server can include a load balancer 212 to distribute requests and actions from tenant users at the one or more organizations 210A-210C to the one or more server systems 204. A user can access the software delivery architecture across the network using a thin client, such as for example a web browser or the like, or other portal software running on a client machine. The application server 202 can access data and data objects stored in one or more data repositories 214. One or more metadata repositories 216 can store metadata including, but not limited to, a set of autonomous user interface metadata containers and work center and view assignments and navigation. The application server 202 can also serve as a middleware component via which access is provided to one or more external software components 220 that can be provided by third party developers.

Figure 3:
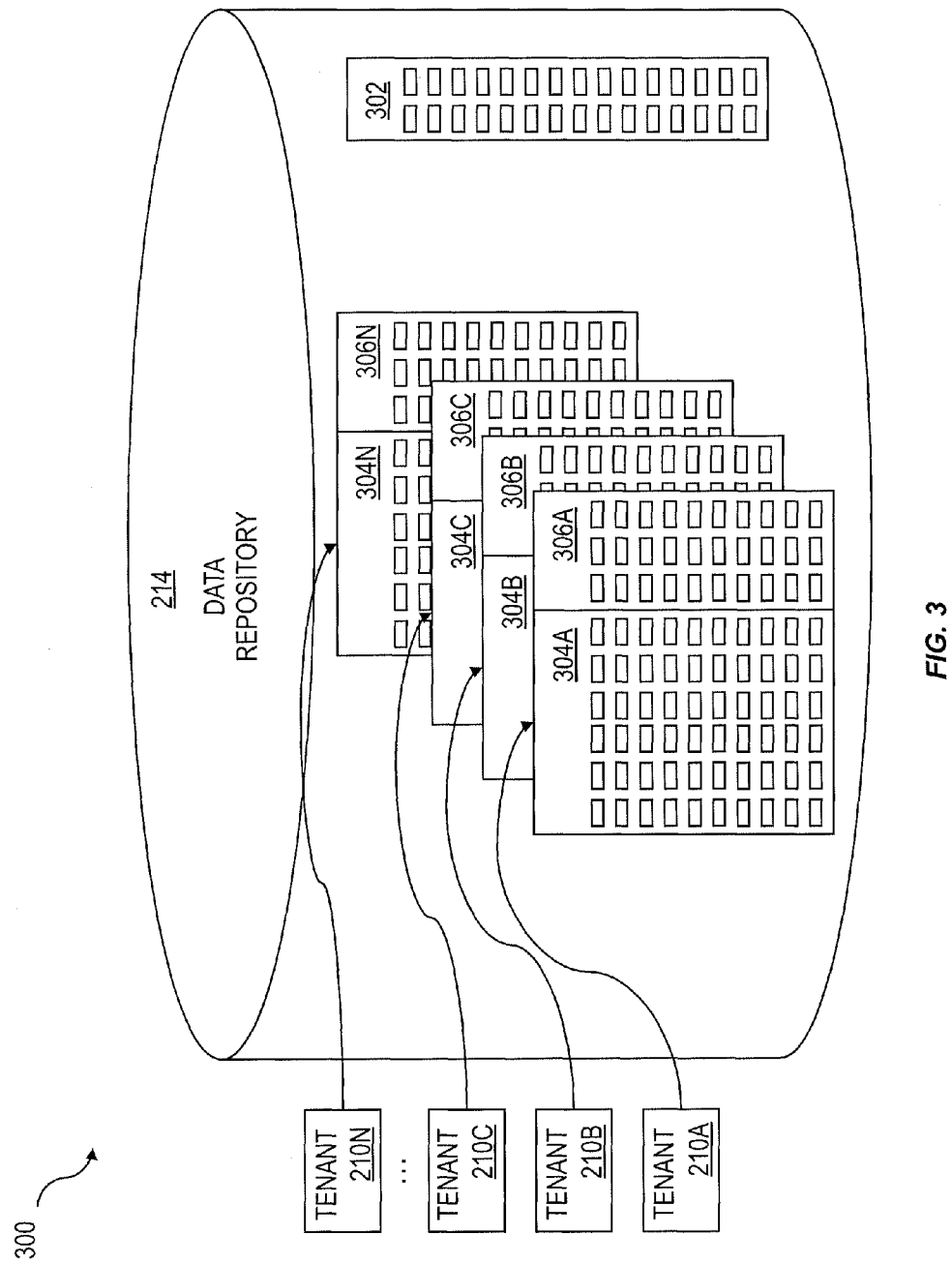
FIG. 3 is a diagram illustrating an example of storage of core software package data objects and tenant-specific data objects for each of multiple tenants of a multi-tenant system.

To provide for customization of the core software platform for tenant users at each of multiple organizations 210A-210C supported by a single software delivery architecture 200, the data and data objects stored in the repository or repositories 214 that are accessed by the application server 302 can include three types of content as shown in FIG. 3: core software platform content 302, system content 304, and tenant content 306. Core software platform content 302 includes content that represents core functionality and is not modifiable by tenant users. System content 304 can in some examples be created by the runtime of the core software platform and can include core data objects that are modifiable with data provided to tenant users at each organization 210A-210N. For example, if the core software platform is an ERP system that includes inventory tracking functionality, the system content 304A-304N can include data objects for labeling and quantifying inventory. The data retained in these data objects are tenant-specific: for example, data in the repository that are isolated to tenant users or each organization 210A-210N includes information about its own inventory. Tenant content 306A-306N includes data objects or extensions to other data objects that are customized for tenant users of one specific organization 210A-210N to reflect business processes and data that are specific to that specific organization's tenant users and are accessible only to authorized tenant users at the corresponding organization. Such data objects can include a key field (for example "client" in the case of inventory tracking) as well as one or more of master data, business configuration information, transaction data or the like. For example, tenant content 306 can include condition records in generated condition tables, access sequences, price calculation results, or any other tenant-specific values. A combination of the software platform content 302 and system content 304 and tenant content 306 of a specific organization are presented to the appropriate tenant such that each tenant provides access to a customized solution whose data are available only to tenant users from the corresponding organization.

In a system where the content is structured in different hierarchy levels, it can be necessary to aggregate more important information to a higher level interface so that a user can more readily discern this more important information. In one example of a multi-tenant architecture such as that described above, at least three user interface hierarchy levels and different kinds of content can be present: core platform tenant independent content (e.g. core platform content 302 and system content 304), tenant-specific content 306, and content from one or more external service providers 220. In such an example, no unique overall aggregation mechanism might be available.

Figure 4:
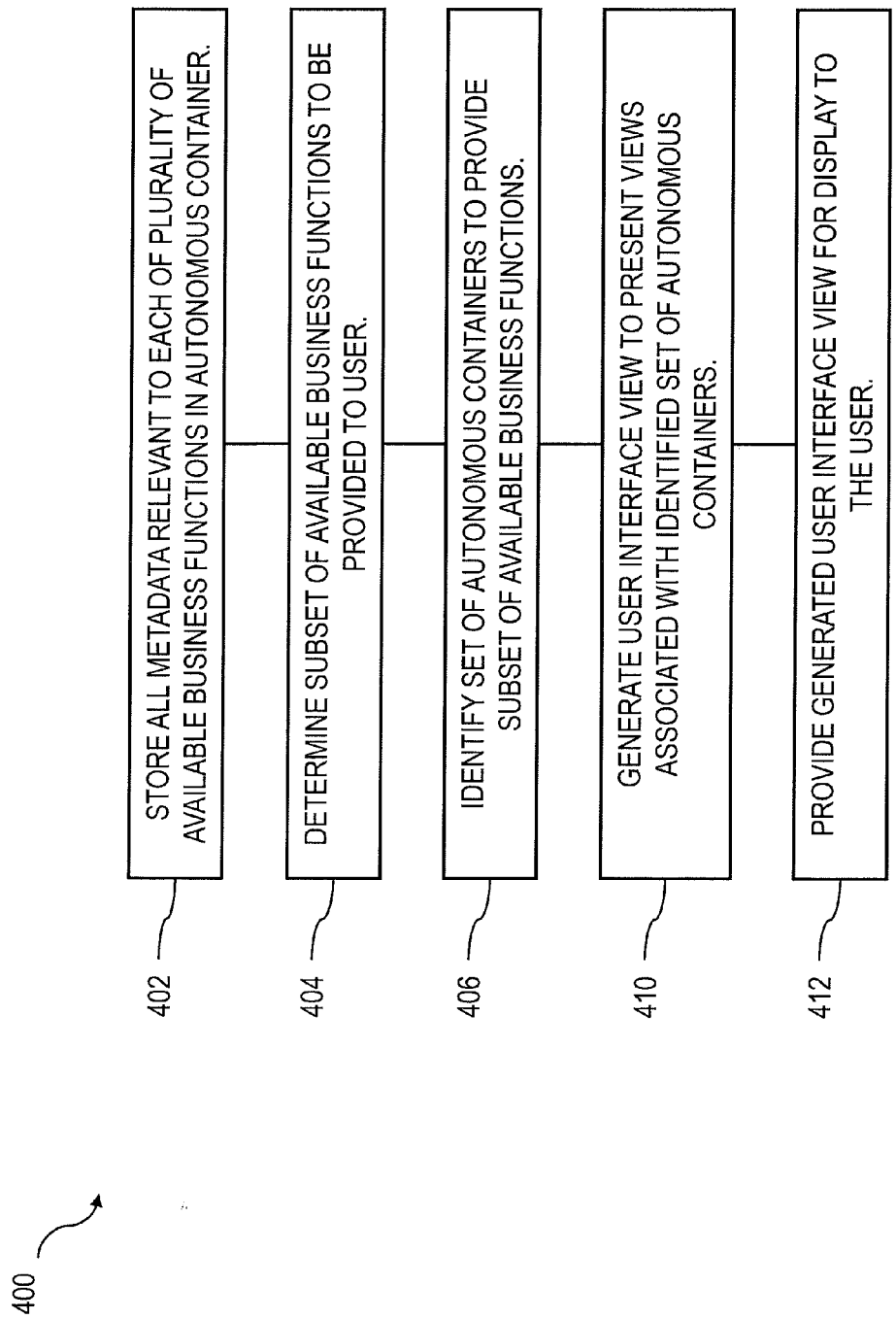
FIG. 4 is a process flow chart illustrating features of a method.

FIG. 4 shows a process flow diagram 400 illustrating features consistent with one or more implementations of the current subject matter. At 402, all metadata relevant to each of a plurality of available business functions can be stored in its own autonomous container. The autonomous metadata containers can be stored in a backend of a system, for example in a user interface metadata repository 216 accessible to one or more server systems 202. Autonomous containers can be provided by one or more service provider systems. For example, in an integrated software architecture that integrates content provided both by a core software platform and by one or more external content providers 220, an external content provider 220 can provide an autonomous metadata container that stores the metadata for one or more business functions related to the content provided by that content provider 220. At 404, a content determination can be made as to what business functionality is to be provided to a specific user. This content determination can be based on one or more authorization and scoping checks that are performed using the user's identity. A set of autonomous containers can be identified at 406 as necessary to provide the determined content for the user. At 410, a user interface view can be generated to present the views associated with the identified set of autonomous containers, and at 412, the user interface view can be provided for display to the user.

A work center view can in some implementations be generated by creating (e.g. if it foes not already exist) a reusable work center view component, and performing one or more of embedding an OWL or the like into the view, defining one or assigned objects to be presented in the view, specifying common tasks and related links, adding an include view if required or desired, defining one or more enterprise search objects within the view, and specifying one or more access contexts of the view, for example based on the appropriate RBAM permissions. Assigned objects can include, but are not limited to navigation targets (e.g. so that one or more appropriate user interface components are reachable form the work center view), include views, external application service interfaces, one or more reports to be offered via the view (which can optionally be aggregated into a report list of a reports view of the work center), one or more task list views providing a collection of BTM task types that are to be exposed to the tasks view of the work center, and the like. The totality of the assigned objects within a view can define the list of authorizations granted to a user who is assigned to the view. An include view can be a technical work center view that does not have a visual representation and that holds all content that does not belong to a specific view but rather to multiple views of a work center (e.g. common task: new corporate account and an assigned object for an account overview in a work center relating to sales orders). Defining enterprise search objects can include assigning an enterprise search controller to the view to ensure that a user assigned to the view is authorized to use an enterprise search functionality of the core software platform.

The current subject matter can, in some implementations, provide a unified content aggregation mechanism for user interface features. Metadata relating to user interface features can be stored at design time in the above-described metadata containers. Content aggregation to work center and control center levels can be accomplished using an aggregation mechanism based on the metadata exposed at design time. Metadata can be checked at design time, exposed, and stored in a run time optimized structure. Exposed entities from views can be aggregated to RLP, work views, an overview, RSS, aggregated common tasks, work center common tasks aggregated from other views, and the like.

Figure 5:
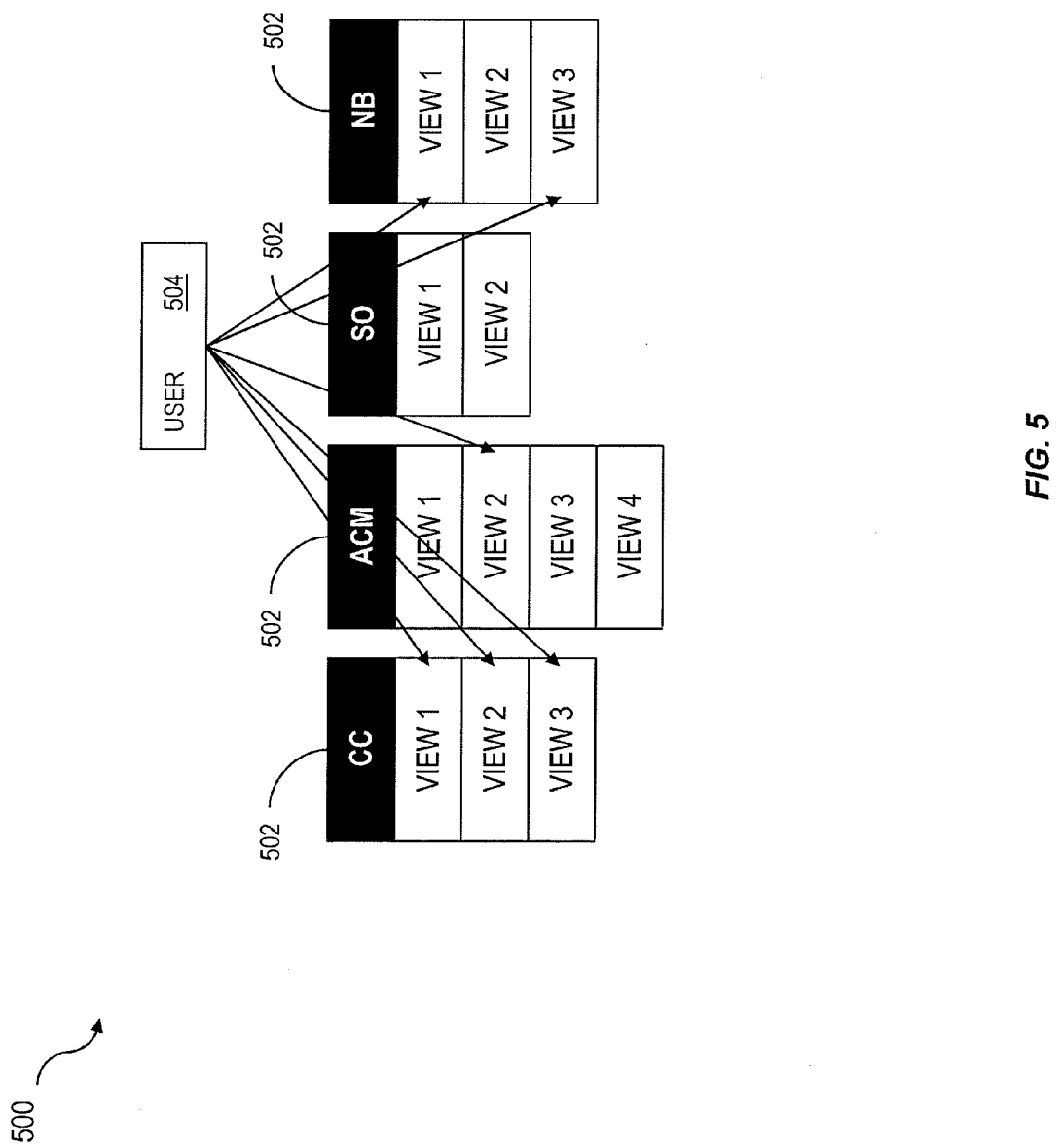
FIG. 5 is a diagram illustrating an example of assigning views to a user.
Figure 6:
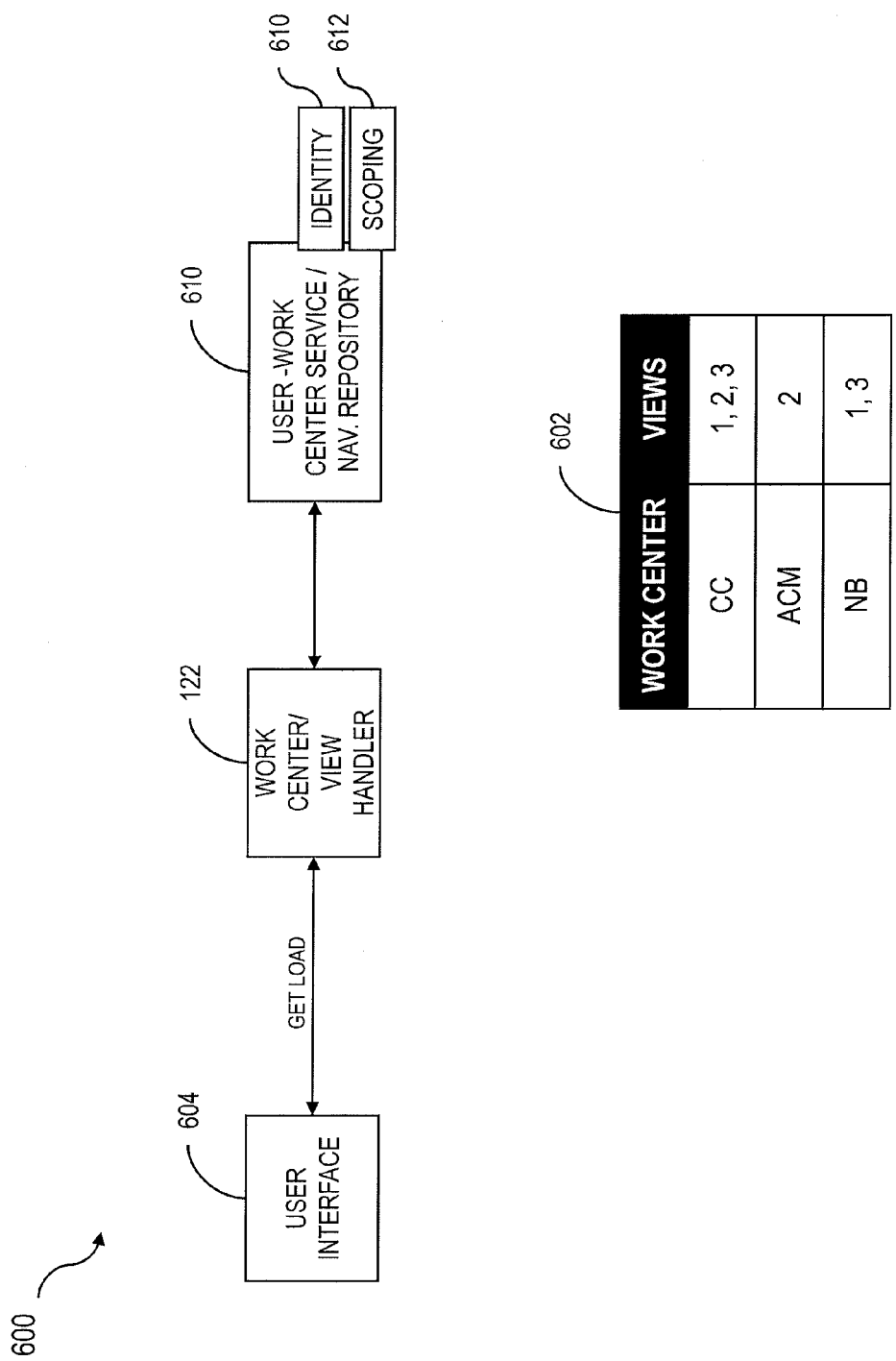
FIG. 6 is a diagram illustrating a user logon process based on work center views.

The assignment diagram 500 of FIG. 5 and the logon process diagram 600 of FIG. 6 illustrates an example of how a subset of the views provided by different work centers 502 can be assigned to a user 502. As shown in FIG. 5, the user 504 is assigned views 1, 2, and 2 of work center CC, view 2 of work center ACM, and views 1 and 2 of work center NB. These assignments as summarized in the view assignment table 602 can be provided to the suer 502 via a user interface 604 by the work center and view handler 222 based on user work center service and navigation metadata 606 retrieved from the metadata repository 216. These user work center service and navigation metadata 606 can include user identity 610 and scoping 612 information that can be used to determine assigned work centers and work center views appropriate for the user 502.

Figure 7:
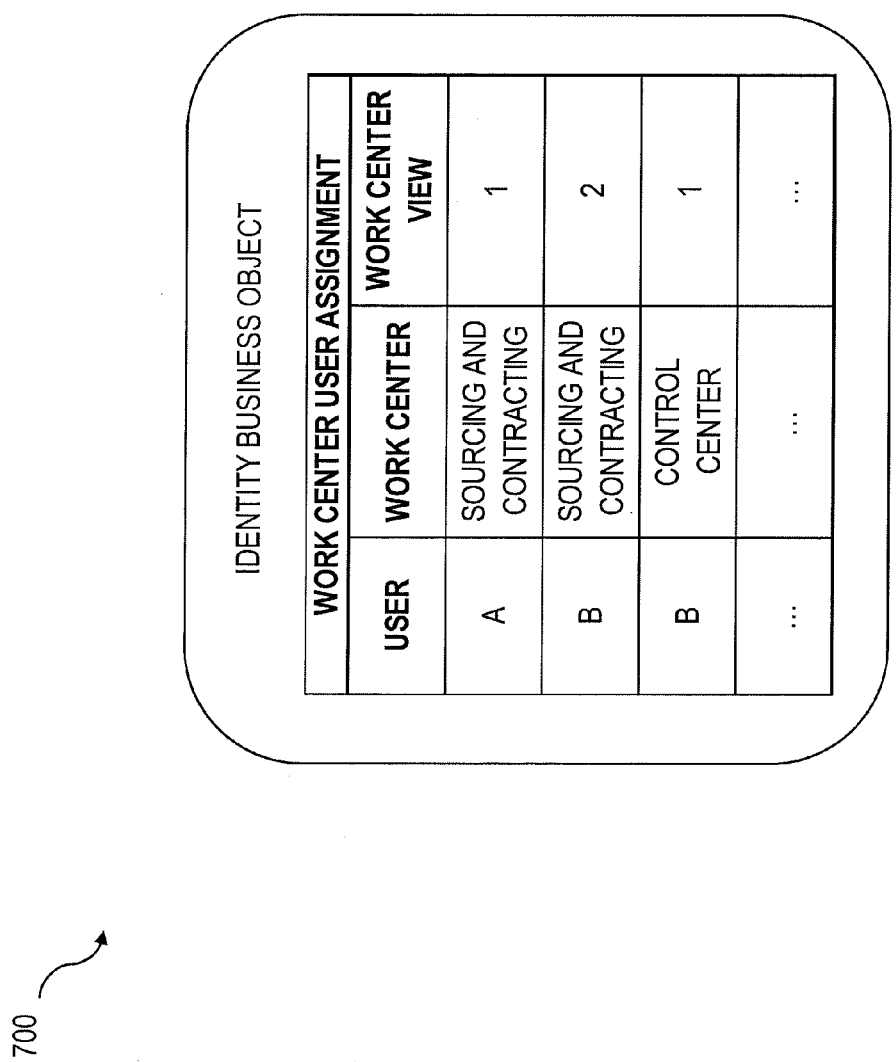
FIG. 7 is a diagram illustrating features of an identity business object.

An example of an identity business object 700 storing identity information 610 and scoping information 612 is shown in FIG. 7. The identity business object 700 can store view assignments for the user 504 (e.g. used for authorization checks) as well as related work center view assignments, which can be necessary if work center views are re-used (e.g. as permitted by the current subject matter) in different work centers. After a user 504 logs on, the work center and view handler 222 is called via a get load command. The identity business object 700 is retrieved, for example from the metadata repository 216 and read to determine appropriate work centers and work center views for the user 504. The metadata repository 216 can provide XML or other coding content based on the work centers and views assigned to the current user 502 and based on the identity information 610 and the scoping information 612.

Figure 8:
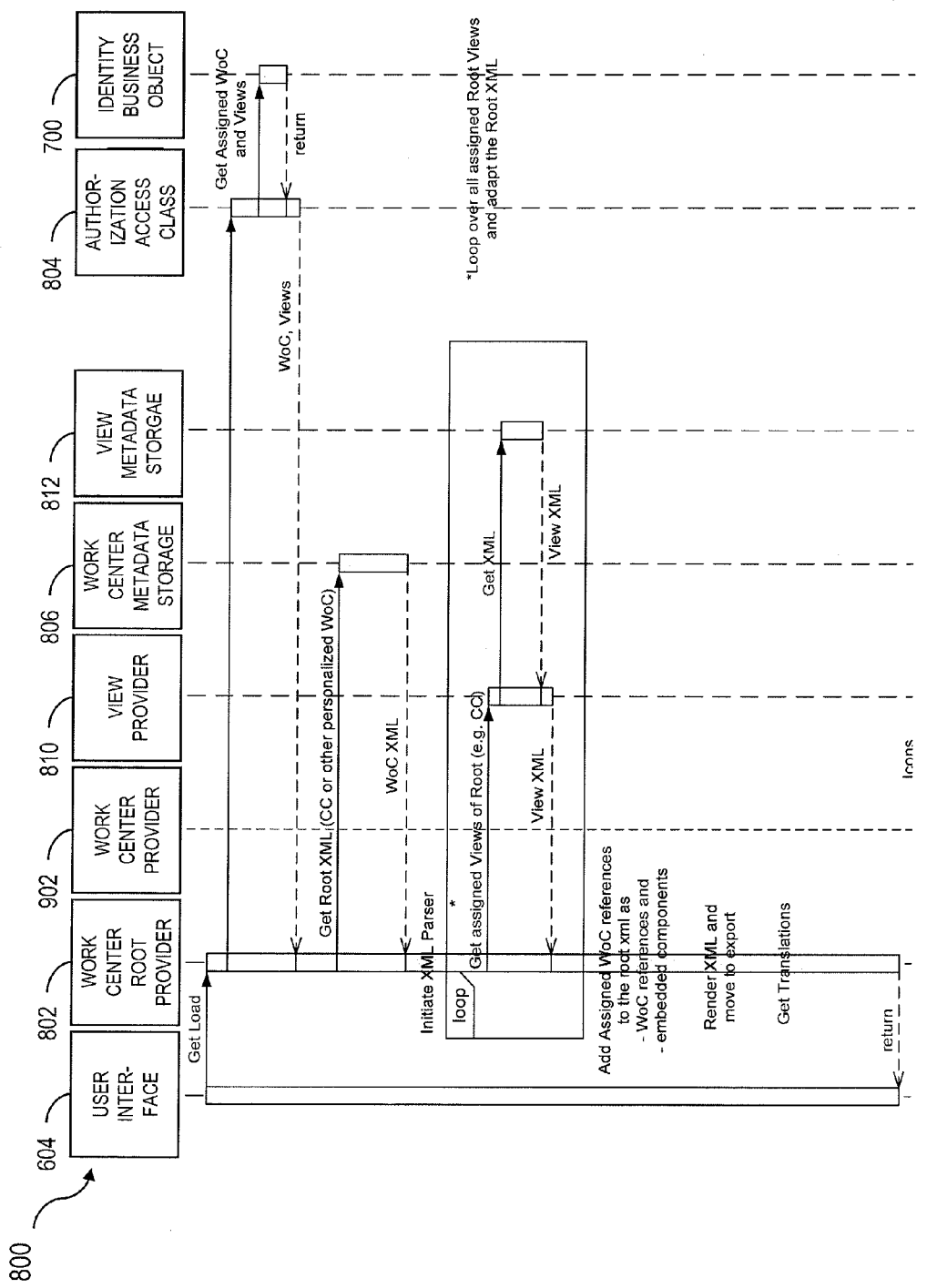
FIG. 8 is a call sequence diagram illustrating features relating to presentation of a work center view according to implementations of the current subject matter.
Figure 9:
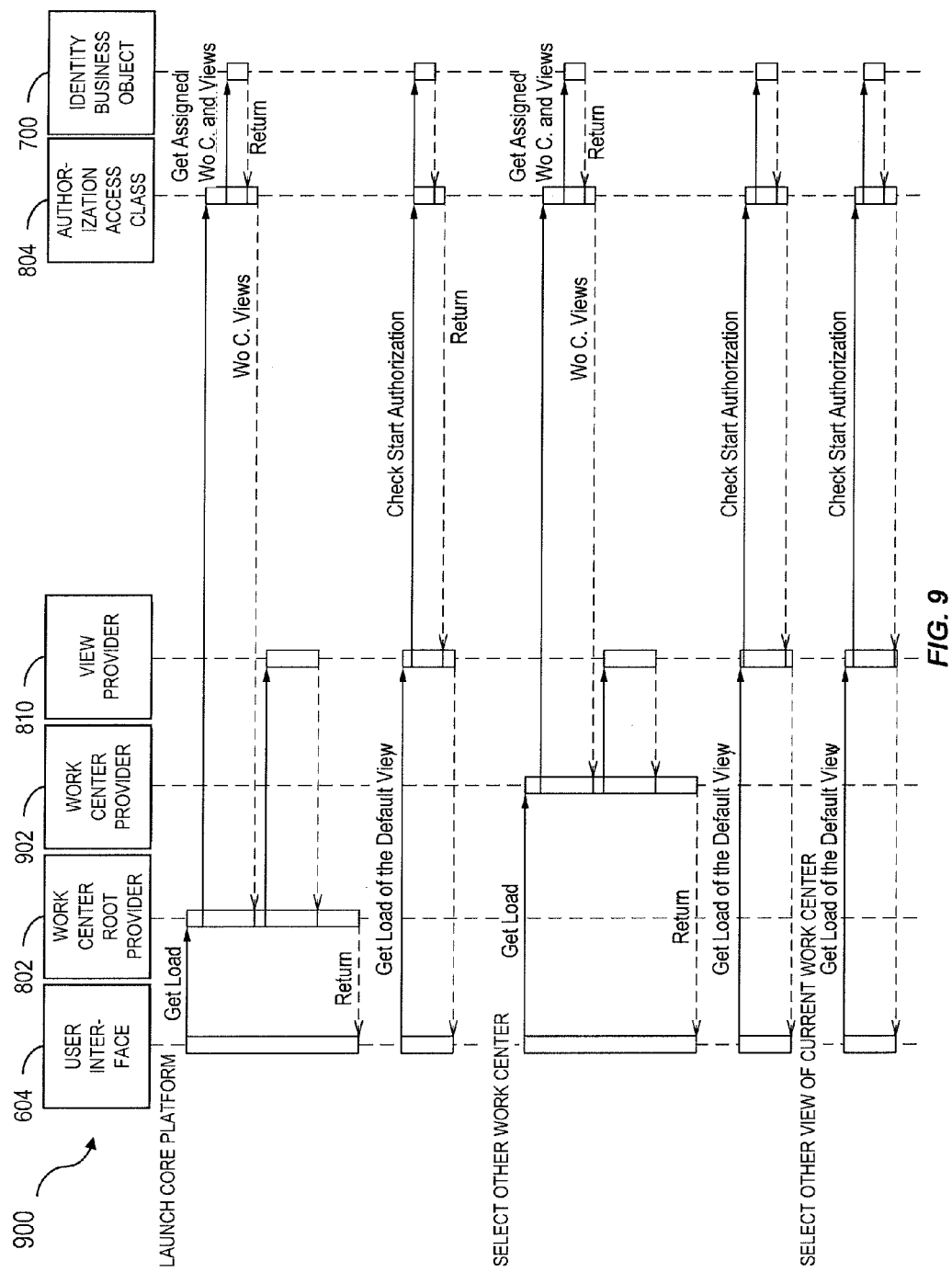
FIG. 9 is a call sequence diagram illustrating features relating to presentation of a work center view according to implementations of the current subject matter.

FIG. 8 and FIG. 9 show examples of sequence diagrams 800, 900 relating to assembly of work center views from application and generic views according to user identity information 610 and scope information 612. As shown in FIG. 8, a user interface 604 can send a get load request to a work center root provider 802, which can in some examples be a part of the work center view handler 122 or alternatively a separate entity (e.g. for work centers provided by external software components 220). The work center root provider 802 can call an authorization access class 804 to access the appropriate identity business object 700 to retrieve the assigned work center(s) and view(s) for the user 504. The work center(s) and view(s) are returned to the work center root provider 802, which then retrieves the root content coding (e.g. XML) for the called work center from a work center metadata storage 806, which can be part of the metadata repository 316, its own standalone metadata repository, or part of another metadata repository. An XML or other content coding parser can be initiated by the work center root provider 802 to iterate through each view associated with the work center to access a view provider 810 for each view, which in turn retrieves the content coding (e.g. XML) for the necessary view(s) from a view metadata storage 812, which can be part of the metadata repository 316, its own standalone metadata repository, or part of another metadata repository.

As shown in FIG. 9, the user interface 604 can, on launch of the core software platform, send a get load request to the work center root provider 802, which calls the authorization access class 804 to access the appropriate identity business object 700 to retrieve the assigned work center(s) and view(s) for the user 504. The work center(s) and view(s) are returned to the work center root provider 802, which then calls the view provider 810 as discussed above in regards to FIG. 8. The user interface 604 receives a load of a default view from the view provider 810. When a selection of a different work center view is received form the user interface 604, of example in response to the user 504 navigating away from the default view, the user interface 604 calls a work center provider 902, which can in some examples be a part of the work center view handler 122 or alternatively a separate entity (e.g. for work centers provided by external software components 220). The work center provider 902 calls the authorization access class 804 to access the appropriate identity business object 700 to retrieve the assigned work center(s) and view(s) for the user 504, and then calls the view provider 810 as discussed above in regards to FIG. 8. Upon the user navigating back to the default work center, the default view is again requested from the view provider 810 and presented to the user interface 604 as discussed in reference to FIG. 8 after the view provider 810 calls the authorization access class 804 to access the appropriate identity business object 700 to retrieve the assigned work center(s) and view(s) for the user 504. When the user interface 604 passes a get load for a different view in the same work center to the view provider 810, for example in response to a user navigation action, the view provider 810 again calls the authorization access class 804 to access the appropriate identity business object 700 to retrieve the assigned work center(s) and view(s) for the user 504, which are then presented in the user interface 604 as described in reference to FIG. 8.

After being saved at design time, or in some implementations at run time if user interface adaptation scenarios are allowed to be performed by a tenant administrator or key user a key user can influence the metadata upon which an aggregation is based, the data associated with a view can be checked, analyzed, and stored in a runtime optimized storage. Extracted data can be tagged based on the scenario to ensure a performance optimized retrieval at run time. Via one or more semantic services, which in some implementations can include a set of methods to interpret the user interface metadata in the assigned and activated containers, the same aggregation mechanism can be called to retrieve the data for an aggregation scenario. In other words, the same method can be used to get all reports for an aggregated reports view as well as to retrieve all BTM tasks for a specific work center view. The unified aggregation mechanism can be based on an extracted, tagged, checked, and runtime optimized metadata storage that can be analyzed via the same semantic service to ensure that runtime issues are avoided and also that the same aggregation behavior based on the current user authorizations and scoping can be achieved.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer program product comprising a non-transitory, machine-readable medium storing instructions that, when executed by at least one programmable processor, cause the at least one programmable processor to perform operations comprising:

storing, in each of a plurality of autonomous metadata containers retained on at least one data storage device, all metadata relevant to user interface functionality needed to provide a specific unit of business functionality;

determining a subset of available business functionality to be provided to a user;

identifying a subset of autonomous metadata containers from the plurality of autonomous metadata containers, the subset of autonomous metadata containers being required to provide the subset of available business functionality;

generating a user interface view to present a view associated with each of the subset of the plurality of autonomous metadata containers; and providing the generated user interface view for display to the user.

2. A computer program product as in claim 1, wherein the set of autonomous metadata containers comprises an application view container and a generic view container, the application view container comprising at least one of data and metadata supporting a business function of a business application, the generic view container comprising a user interface structure that incorporates at least one of data and metadata associated with at least one of the application view and another generic view.

3. A computer program product as in claim 1, wherein the determining of the subset of available business functionality to be provided to a user comprises accessing a previously stored identity business object comprising authorization checks for view assignments for the user and related work center view assignments for the user.

4. A computer program product as in claim 1, wherein the subset of autonomous metadata containers is selected such that the user interface view is consistent with permissions or authorizations held by or assigned to the user, a business scope assigned to the user, a current application context within which the user is working, and adaptations of one or more applications available to the user.

5. A computer program product as in claim 1, wherein the providing of the generated user interface view occurs via a client tenant of a multi-tenant system comprising an application server providing access for each of a plurality of organizations to one of a plurality of client tenants, each of the plurality of client tenants comprising a customizable, organization-specific version of a core software platform that also integrates business functionality provided by at least one external software provider, the plurality of tenants accessing a data repository comprising core software platform content relating to the operation of the core software platform and that is common to all of the plurality of client tenants, system content having a system content format defined by the core software platform and containing system content data that are unique to specific client tenants of the plurality of client tenants, and client tenant-specific content whose tenant-specific content formats and tenant-specific content data are defined by and available to only one of the plurality of client tenants.

6. A computer program product as in claim 5, wherein the subset of autonomous metadata containers comprises a first autonomous metadata container comprising a first view relating to at least one of the core platform content and the system content, a second autonomous metadata container comprising a second view relating to the client tenant-specific content, and a third autonomous metadata container comprising a third view relating to external content relating to external service provider content from the at least one external service provider.

7. A system comprising:
at least one programmable processor; and
a machine-readable medium storing instructions that, when executed by the at least one programmable processor, cause the at least one programmable processor to perform operations comprising:
storing, in each of a plurality of autonomous metadata containers retained on at least one data storage device, all metadata relevant to user interface functionality needed to provide a specific unit of business functionality;
determining a subset of available business functionality to be provided to a user;
identifying a subset of autonomous metadata containers from the plurality of autonomous metadata containers, the set of autonomous metadata containers being required to provide the subset of available business functionality;
generating a user interface view to present a view associated with each of the subset of the plurality of autonomous metadata containers; and
providing the generated user interface view for display to the user.

8. A system as in claim 7, wherein the set of autonomous metadata containers comprises an application view container and a generic view container, the application view container comprising at least one of data and metadata supporting a business function of a business application, the generic view container comprising a user interface structure that incorporates at least one of data and metadata associated with at least one of the application view and another generic view.

9. A system as in claim 7, wherein the determining of the subset of available business functionality to be provided to a user comprises accessing a previously stored identity business object comprising authorization checks for view assignments for the user and related work center view assignments for the user.

10. A system as in claim 7, wherein the subset of autonomous metadata containers is selected such that the user interface view is consistent with permissions or authorizations held by or assigned to the user, a business scope assigned to the user, a current application context within which the user is working, and adaptations of one or more applications available to the user.

11. A system as in claim 7, wherein the providing of the generated user interface view occurs via a client tenant of a multi-tenant system comprising an application server providing access for each of a plurality of organizations to one of a plurality of client tenants, each of the plurality of client tenants comprising a customizable, organization-specific version of a core software platform that also integrates business functionality provided by at least one external software provider, the plurality of tenants accessing a data repository comprising core software platform content relating to the operation of the core software platform and that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

12. A system as in claim 11, wherein the subset of autonomous metadata containers comprises a first autonomous metadata container comprising a first view relating to at least one of the core platform content and the system content, a second autonomous metadata container comprising a second view relating to the client tenant-specific content, and a third autonomous metadata container comprising a third view relating to external content relating to external service provider content from the at least one external service provider.

13. A computer-implemented method comprising:
storing, in each of a plurality of autonomous metadata containers retained on at least one data storage device, all metadata relevant to user interface functionality needed to provide a specific unit of business functionality;
determining a subset of available business functionality to be provided to a user;
identifying a subset of autonomous metadata containers from the plurality of autonomous metadata containers, the set of autonomous metadata containers being required to provide the subset of available business functionality;
generating a user interface view to present a view associated with each of the subset of the plurality of autonomous metadata containers; and
providing the generated user interface view for display to the user.

14. A computer-implemented method as in claim 13, wherein the set of autonomous metadata containers comprises an application view container and a generic view container, the application view container comprising at least one of data and metadata supporting a business function of a business application, the generic view container comprising a user interface structure that incorporates at least one of data and metadata associated with at least one of the application view and another generic view.

15. A computer-implemented method as in claim 13, wherein the determining of the subset of available business functionality to be provided to a user comprises accessing a previously stored identity business object comprising authorization checks for view assignments for the user and related work center view assignments for the user.

16. A computer-implemented method as in claim 13, wherein the subset of autonomous metadata containers is selected such that the user interface view is consistent with permissions or authorizations held by or assigned to the user, a business scope assigned to the user, a current application context within which the user is working, and adaptations of one or more applications available to the user.

17. A computer-implemented method as in claim 13, wherein the providing of the generated user interface view occurs via a client tenant of a multi-tenant system comprising an application server providing access for each of a plurality of organizations to one of a plurality of client tenants, each of the plurality of client tenants comprising a customizable, organization-specific version of a core software platform that also integrates business functionality provided by at least one external software provider, the plurality of tenants accessing a data repository comprising core software platform content relating to the operation of the core software platform and that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

18. A computer-implemented method as in claim 17, wherein the subset of autonomous metadata containers comprises a first autonomous metadata container comprising a first view relating to at least one of the core platform content and the system content, a second autonomous metadata container comprising a second view relating to the client tenant-specific content, and a third autonomous metadata container comprising a third view relating to external content relating to external service provider content from the at least one external service provider.

19. A computer-implemented method as in claim 13, wherein at least one of the storing, the determining, the identifying, the generating, and the providing is performed by at least one programmable processor.

* * * * *